United States Patent
Cole et al.

(10) Patent No.: US 9,686,174 B2
(45) Date of Patent: Jun. 20, 2017

(54) SCALABLE EXTENDABLE PROBE FOR MONITORING HOST DEVICES

(71) Applicants: Raymond E. Cole, Fort Collins, CO (US); Nimal K. K. Gamage, Fort Collins, CO (US)

(72) Inventors: Raymond E. Cole, Fort Collins, CO (US); Nimal K. K. Gamage, Fort Collins, CO (US)

(73) Assignee: CA, Inc., New York, NY (US)

( * ) Notice: Subject to any disclaimer, the term of this patent is extended or adjusted under 35 U.S.C. 154(b) by 533 days.

(21) Appl. No.: 14/340,170

(22) Filed: Jul. 24, 2014

(65) Prior Publication Data
US 2016/0028606 A1    Jan. 28, 2016

(51) Int. Cl.
*H04L 12/26* (2006.01)
*H04L 12/24* (2006.01)

(52) U.S. Cl.
CPC .......... *H04L 43/12* (2013.01); *H04L 43/0817* (2013.01); *H04L 43/16* (2013.01); *H04L 41/0609* (2013.01)

(58) Field of Classification Search
CPC ..... H04L 43/12; H04L 43/0817; H04L 43/16; H04L 41/0609
See application file for complete search history.

(56) References Cited

U.S. PATENT DOCUMENTS

| | | | | |
|---|---|---|---|---|
| 5,991,525 A * | 11/1999 | Shah | ............ | G05B 13/04 700/29 |
| 9,396,287 B1 * | 7/2016 | Bhave | ............ | G06F 17/30979 |
| 2002/0145981 A1 * | 10/2002 | Klinker | ............ | H04L 12/5695 370/244 |
| 2003/0162539 A1 * | 8/2003 | Fiut | ............ | H04W 24/00 455/424 |
| 2004/0052259 A1 * | 3/2004 | Garcia | ............ | H04L 12/2602 370/392 |
| 2005/0065753 A1 * | 3/2005 | Bigus | ............ | G06N 5/048 702/186 |
| 2008/0046558 A1 * | 2/2008 | Raja | ............ | H04L 41/5009 709/224 |
| 2008/0269813 A1 * | 10/2008 | Greenhut | ............ | A61B 5/042 607/5 |
| 2009/0030652 A1 * | 1/2009 | Greco | ............ | G06F 11/3409 702/182 |

(Continued)

*Primary Examiner* — Oanh Duong
(74) *Attorney, Agent, or Firm* — Baker Botts L.L.P.

(57) ABSTRACT

According to one embodiment, a system includes a probe controller associated with a host device and configured to abstract a plurality of device-specific monitoring operations associated with a plurality of heterogeneous host devices to a normalized set of monitoring operations. The probe controller facilitates monitoring of the host device using the normalized set of monitoring operations. The system also includes a first specialized probe module associated with the host device and configured to provide device-specific information in response to the normalized set of monitoring operations. The first specialized probe module accesses, in response to receiving a notification from the probe controller to determine a metric associated with the host device, the metric associated with the host device. The first specialized probe module communicates the metric to the probe controller.

20 Claims, 4 Drawing Sheets

(56) References Cited

U.S. PATENT DOCUMENTS

| | | | |
|---|---|---|---|
| 2013/0198541 A1* | 8/2013 | Rabii | G06F 1/26 713/320 |
| 2013/0311794 A1* | 11/2013 | Stewart | G06F 1/26 713/300 |
| 2014/0047107 A1* | 2/2014 | Maturana | H04L 43/04 709/224 |
| 2014/0188398 A1* | 7/2014 | Cohen | A61B 5/14532 702/19 |
| 2014/0266691 A1* | 9/2014 | McKinley | G08B 25/016 340/539.11 |
| 2014/0313017 A1* | 10/2014 | Taira | G08C 19/24 340/12.22 |
| 2014/0316811 A1* | 10/2014 | Ohnemus | G06F 19/322 705/3 |
| 2015/0022924 A1* | 1/2015 | Barrenscheen | G06F 1/28 361/86 |

* cited by examiner

SCALABLE EXTENDABLE PROBE FOR MONITORING HOST DEVICES

BACKGROUND

The disclosure relates generally to computing devices, and more specifically to a scalable extendable probe for monitoring host devices in a distributed computing environment.

A distributed computing environment typically comprises various computing systems that may communicate over a network while performing various operations. An administrator of a distributed computing environment may monitor information associated with one or more of these computing systems.

SUMMARY

According to one embodiment of the disclosure, a system includes a memory operable to store instructions and a processor communicably coupled to the memory and operable to execute the instructions. The instructions comprise a probe controller associated with a host device and configured to abstract a plurality of device-specific monitoring operations associated with a plurality of heterogeneous host devices to a normalized set of monitoring operations. The probe controller facilitates monitoring of the host device using the normalized set of monitoring operations. The instructions also comprise a first specialized probe module associated with the host device and configured to provide device-specific information in response to the normalized set of monitoring operations. The first specialized probe module accesses, in response to receiving a notification from the probe controller to determine a metric associated with the host device, the metric associated with the host device. The first specialized probe module communicates the metric to the probe controller.

In particular embodiments, the probe controller receives the metric from the first specialized probe module and publishes the metric. In particular embodiments, a programming-language-independent interface facilitates communication between the probe controller and the first specialized probe module.

Other objects, features, and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the objects, features, and advantages thereof, reference now is made to the following description taken in connection with the accompanying drawings. Aspects of the present disclosure are illustrated by way of example and are not limited by the accompanying figures with like references indicating like elements.

DETAILED DESCRIPTION

Figure 1:
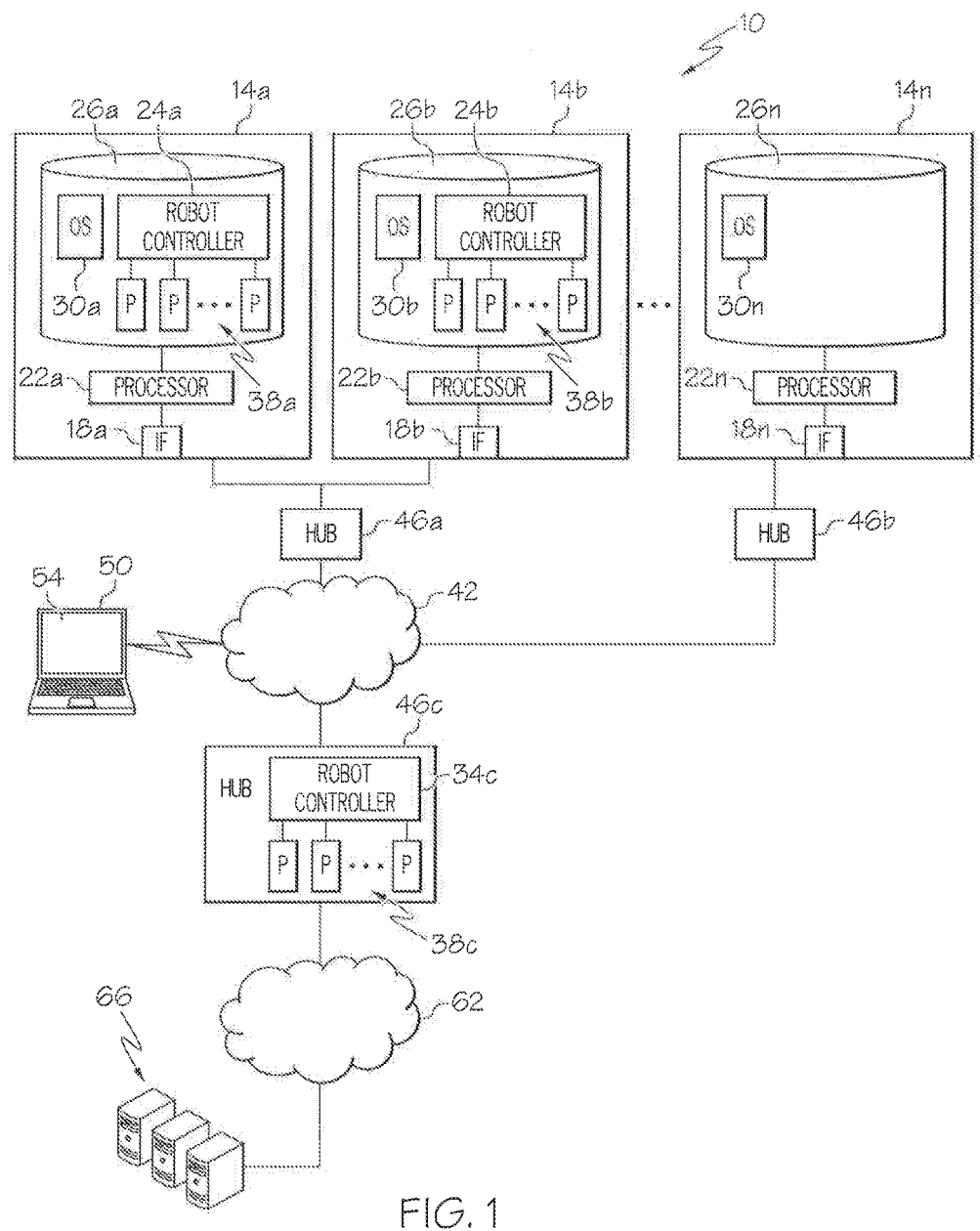
FIG. 1 illustrates an example of a system for monitoring information associated with host devices according to one embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FOR- TRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In general, aspects of the present disclosure relate to monitoring information associated with heterogeneous computing systems in a distributed computing environment. In particular embodiments, a network administrator may install probes on a host device to monitor some aspect of the host device. For example, a network administrator may install a probe on a database server to monitor database operations, a probe on a web server to monitor web server operations, or a probe on a file server to monitor disk usage information or CPU usage information. Different probes may operate on different computing platforms and collect different information. For example, a database probe may operate on a UNIX server and may collect different information than a file server probe operating on a Windows server. As another example, two probes may operate on the same Windows server where one probe monitors disk usage and one probe monitors CPU usage. Different probes may also share some functionality in common. For example, all probes may schedule data collection for some cyclic interval, or all probes may compare collected data against a threshold value. Additionally, all probes may communicate collected information with other elements of the network. Some advantages, such as those described below, may be realized by separating a probe into a probe controller operable to perform the functions common among all probes and a specialized probe module plugin operable to perform the specialized functions of a particular probe.

FIG. 1 illustrates an example of a system 10 for monitoring information associated with host devices 14 according to one embodiment of the present disclosure. As illustrated, system 10 includes host devices 14 and probes 38 installed on various host devices 14. Host devices 14 may represent a plurality of heterogeneous network elements. Probes 38 may monitor information associated with host devices 14. Probes 38 may monitor any information (or data) associated with host devices 14, such as information regarding applications installed on a host device 14, information regarding any host device 14 and/or any other devices connected to one or more networks, information regarding virtualization associated with host device 14, information regarding storage associated with a host device 14, information regarding cloud computing associated with a host device 14, any other information associated with a host device 14, any other suitable information, or any combination of the preceding.

By monitoring information associated with host devices 14, probes 38 may gather such information for various purposes. As examples, at least a portion of the monitored information may be provided for view by a user, at least a portion of the monitored information may be stored (such as for later use and/or for later reference), at least a portion of the monitored information may be processed, grouped, characterized, and/or summarized for view by a user, at least a portion of the monitored information may be compared to one or more thresholds, any other suitable use of the monitored information, or any combination of the preceding.

Host device 14 represents any components operable to process information, and may be implemented using any suitable combination of hardware, firmware, and software. Host device 14 may include any suitable type of computer system, such as a network server, any remote server, a mainframe, a host computer, a workstation, a web space server, a personal computer, a file server, a virtual device, or any other device that may electronically process information. The operations of host device 14 may be performed by any combination of one or more components at one or more locations. Host device 14 may include an operating system 30 that manages resources and provides services for computer programs installed on host device 14. Host device 14 may include (and/or may otherwise be associated with) information that may be monitored. In the illustrated embodiment, host device 14 includes a network interface 18, a processor 22, and a memory 26.

Network interface 18 represents any components operable to receive information from network 42, transmit information through network 42, perform processing of information, communicate to other devices, or any combination of the preceding, and may be implemented using any suitable combination of hardware, firmware, and software. For example, network interface 18 may receive information from hub 46. As another example, network interface 18 may communicate information for display to a user on user device 50. Network interface 18 represents any port or connection, real or virtual, including any suitable hardware and/or software, including protocol conversion and data processing capabilities, to communicate through a LAN, a metropolitan area network (MAN), a WAN, or other communication system that allows host device 14 to exchange information with network 42, user device 50, information database 58, or other components of system 10.

Processor 22 communicatively couples to network interface 18 and memory 26, and controls the operation and administration of host device 14 by processing information received from network interface 18 and memory 26. For example, processor 22 executes operating system 30 to manage resources and provide services for one or more applications and/or computer programs. Processor 22 may be a programmable logic device, a microcontroller, a microprocessor, any processing device, or any combination of the preceding.

Memory 26 stores, either permanently or temporarily, data, operational software, or other information for processor 22. Memory 26 includes any suitable combination of volatile or non-volatile local or remote devices suitable for storing information. For example, memory 26 may include RAM, ROM, magnetic storage devices, optical storage devices, or any other information storage device or a combination of these devices. While illustrated as including particular modules, memory 26 may include any information for use in the operation of host device 14.

In the illustrated embodiment, memory 26 includes operating system 30, robot controller 34, and probes 38. Operating system 30 represents any suitable set of instructions, logic, or code embodied in a computer readable storage medium and operable to manage resources and provide services for one or more applications and/or computer programs. Operating system 30 may include any suitable operating systems, such as IBM's zSeries/Operating System (z/OS), MS-DOS, PC-DOS, MAC-OS (such as MAC OS X), WINDOWS, UNIX, OpenVMS®, LINUX®, SOLARIS, ADVANCED INTERACTIVE EXECUTIVE (AIX), HP-UX®, UBUNTU®, DEBIAN®, or any other appropriate operating systems, including future operating systems.

Robot controller 34 represents any suitable set of instructions, logic, or code embodied in a computer readable storage medium and operable to control probes 38. Robot controller 34 may be implemented using any suitable combination of hardware, firmware, and software. The present disclosure contemplates robot controller 34 being operable to control any aspect of probes 38. For example, robot controller 34 may control: which probes 38 are installed on a host device 14 (such as by installing, re-installing, and/or uninstalling particular probes 38 on a host device 14); when probes 38 monitor information associated with a host device 14; the type of information that probes 38 monitor for; any transmission of the monitored information over network 42 (such as when a transmission may occur and what information may be included in a transmission); any other aspect associated with probes 38; or any combination of the preceding. In certain embodiments, robot controller 34 may further control any aspect regarding the monitoring of information associated with host devices 14.

Probe 38 represents any suitable set of instructions, logic, or code embodied in a computer readable storage medium and operable to monitor information associated with host devices 14. Probe 38 may be implemented using any suitable combination of hardware, firmware, and software. Each probe 38 may perform a particular operation or set of operations associated with monitoring information of one or more corresponding host devices 14. For example, a first probe 38 may monitor for a first type of information, while a second probe 38 (and any other subsequent probes 38) may monitor different types of information. Additionally, or alternatively, a single probe 38 may perform multiple operations and/or may monitor multiple types of information.

The types of information that a probe 38 may monitor may include any suitable combination of: (1) network-based information; (2) application-based information; (3) virtualization-based information; (4) storage-based information; (5) cloud-based information; and (6) any other suitable type of information. As an example, a probe 38 may monitor information regarding applications installed on host devices 14 (such as what applications are installed, what applications are currently running, what applications have expired service contracts, etc.), information regarding any host device 14 and/or any other devices connected to one or more networks (such as the Internet Protocol (IP) address of any host device, the Media Access Control (MAC) address of any host device, the user of a host device, etc.) information regarding virtualization associated with a host device 14 (such as how much processing power is being utilized by a host device 14, how much processing power is unused, etc.), information regarding storage associated with a host device 14 (such as how much storage is currently being used, how much storage is not being used, the type of storage (e.g., RAM, ROM, etc.), etc.), information regarding cloud computing associated with a host device 14 (such as what host devices 14 are implemented in cloud computing, the cost associated with the cloud computing, etc.), any other information associated with a host device 14, or any combination of the preceding.

As a further example, probes 38 may monitor for alarms associated with host devices 14. As just one example, one or more thresholds may be established for the host device 14 (such as a threshold of 80% processor usage), and when those thresholds are reached (or exceeded), an alarm may be generated, which may be detected and/or generated by probes 38. Probes 38 may monitor information regarding alarms (and/or thresholds) associated with a host device 14 (such as what types of alarms are being monitored for, what alarms have been generated, how long an alarm has been generated for, etc.). As another example, probes 38 may monitor for usage information of robot controllers 34 and probes 38. In such an example, as robot controllers 34 and probes 38 are used to monitor information, their usage may be monitored and stored.

Although FIG. 1 is illustrated as only including three probes 38 installed on a particular host device 14 (e.g., three probes 38*a* installed on host device 14*a* and three probes 38*b* installed on host device 14*b*), any number of probes 38 may be installed on a host device 14. For example, a host device 14 may include no probes 38, a single probe 38, ten probes 38, one hundred probes 38, one thousand probes 38, or any other number of probes 38.

Furthermore, although FIG. 1 is illustrated as only including three host devices (e.g., host device 14*a*, host device 14*b*, and host device 14*n*), any number of host devices 14 may be included in system 10. For example, system 10 may include a single host device 14, ten host devices 14, one hundred host devices 14, one thousand host devices 14, or any other number of host devices 14. Additionally, although host device 14 has been described above as including a robot controller 34 and probes 38, in particular embodiments, one or more host devices 14 may not include a robot controller 34 and/or probes 38. For example, as is illustrated in FIG. 1, host device 14*n* may not include either a robot controller 34 or any probes 38. Instead, if appropriate, one or more probes 38 installed on another host (such as host device 14*a*) may monitor information associated with host device 14*n*, in particular embodiments. As such, probes 38 may be able to monitor any type of information associated with host device 14n (such as information regarding memory usage in host device 14n, processing capabilities in host device 14n, applications installed in host device 14n, or any other information) without probes 38 (or a robot controller 34) being installed on host device 14n.

Network 42 represents any network operable to facilitate communication between various components of system 10, such as host devices 14, hub 46, user device 50, and information database 58. Network 42 may facilitate message exchange between hubs 46, robot controllers 34, probes 38, user device 50, and information database 58. In some embodiments, network 42 may be referred to as message bus 42. Network 42 may include any interconnecting system capable of transmitting audio, video, signals, data, messages, or any combination of the preceding. Network 42 may include all or a portion of a public switched telephone network (PSTN), a public or private data network, a LAN, a MAN, a WAN, a local, regional, or global communication or computer network, such as the Internet, a wireline or wireless network, an enterprise intranet, or any other communication link, including combinations thereof, operable to facilitate communication between the components.

Hub 46 represents any components operable to link robot controllers 34 to each other, and may be implemented using any suitable combination of hardware, firmware, and software. For example, hub 46a may allow a first robot controller 34 (such as robot controller 34a) to communicate with and/or coordinate with any other robot controller (such as robot controller 34b). Hub 46 may include any suitable type of computer system, such as a network server, any remote server, a mainframe, a workstation, a web space server, a personal computer, a file server, a virtual device, or any other device that may link robot controllers 34 to each other. The functions of hub 46 may be performed by any combination of one or more servers or other components at one or more locations. In the embodiment where the module is a server, the server may be a virtual or physical server. The server may include one or more servers at the same or remote locations. Also, hub 46 may include any component that functions as a server. Hub 46 may represent any suitable set of instructions, logic, or code embodied in a computer readable storage medium and operable to link robot controllers 34 to each other, in particular embodiments. As an example, hub 46 may be a particular type of robot controller (such as, for example, a robot controller 34) that may utilize (and/or control) one or more particular types of probes (such as, for example, probes 38) to link robot controllers 34 to each other.

In particular embodiments, hub 46 may link other hubs 46 to each other. For example, hub 46c may link hubs 46a and 46b to each other. In some embodiments, hubs 46 may be linked in a hierarchical relationship. For example, in certain embodiments, both hubs 46a and 46b may communicate with hub 46c, but hubs 46a and 46b may not communicate with each other. In particular embodiments, any hub 46 may communicate with any other hub 46. In particular embodiments, hubs 46 may be organized hierarchically with central hubs responsible for regional hubs. Regional hubs may serve a regional office, a datacenter, a campus, or any other suitably sized portion of a network.

In particular embodiments, a hub 46 may control any aspect of robot controllers 34. For example, hub 46 may: control which robot controllers 34 are installed on a host device 14 (such as by installing, re-installing, and/or uninstalling a particular robot controller 34 on a host device 14); control transmission of the monitored information over network 42 (such as when a transmission may occur and what information may be included in a transmission); control any other aspect associated with robot controllers 34; provide instructions to a robot controller 34 (such as instructions regarding what probes 38 to install, what information a probe 38 should monitor for, or any other instructions); or any combination of the preceding.

Hub 46 may provide access control, in particular embodiments. For example, hub 46 may determine whether a first robot controller 34 (such as robot controller 34a) is allowed to access (e.g., communicate with, coordinate with, etc.) another robot controller 34 (such as robot controller 34b) based on a permission level of the first robot controller 34 and/or the other robot controller 34. For example, if the first robot controller 34 does not have the correct permission level to communicate with the other robot controller, hub 46 may prevent the first robot controller 34 from doing so. Such access control provided by hub 46 may be applicable to host devices 14 and probes 38, thereby allowing or preventing access to host devices 14 and/or probes 38 (in addition to robot controllers 34). For example, hub 46 may prevent a first probe 38 (such as one of probes 38a) from accessing another host device 14 and/or another probe 38 if the first probe 38 does not have the correct permission level.

Hub 46 may further link the devices of network 42 to one or more devices of network 62, such as monitoring database 66. For example, hub 46 may be an access point through which communication may pass from monitoring database 66 to one or more devices of network 42 (or vice versa). In such an example, hub 46 may allow one or more probes 38 to be downloaded (or otherwise communicated) from monitoring database 66 to a host device 14 for installation. Furthermore, by acting as an access point through which communication may pass from monitoring database 66 to one or more devices of network 42, hub 46 may provide security for network 42.

Although FIG. 1 illustrates hub 46 as being a separate component from the other components of FIG. 1, in particular embodiments, hub 46 may be integrated with any of the other components of FIG. 1. As an example, hub 46 may be integrated with a host device 14, such as host device 14a. In such an example, instructions, logic, or code associated with hub 46 may be stored in memory 26a of host device 14a. This may allow host device 14a (and processor 22a) to perform one or more functions of hub 46 (in addition to one or more functions of robot controller 34a). In particular embodiments, other components of FIG. 1 may be integrated with hub 46. As an example, hub 46 (such as hub 46c) may include a robot controller (such as robot controller 34c) and probes 38 (such as probes 38c). Furthermore, while FIG. 1 illustrates only a single hub 46 connecting network 62 to network 42, in particular embodiments, any suitable number of hubs 46 may connect network. 62 to network 42. For example, two hubs 46 may connect network 62 to network 42, three hubs 46 may connect network 62 to network 42, ten hubs 46 may connect network 62 to network 42, or any other number of hubs 46 may connect network 62 to network 42.

Additionally, although system 10 is illustrated as including only one network 42, in particular embodiments, system 10 may include any number of hubs 46 and networks 42. For example, system 10 may include two hubs 46 and two networks 42, three hubs 46 and three networks 42, ten hubs 46 and ten networks 42, or any other number of hubs 46 and any other number of networks 42.

User device 50 represents any components (hardware and/or software) that may display information to a user. User device 50 may include a personal computer, a workstation, a laptop, a wireless or cellular telephone, an electronic notebook, a personal digital assistant, or any other device (wireless, wireline, or otherwise) capable of receiving, processing, storing, and/or communicating information with other components of system 10 in order to display information to a user. User device 50 may further allow a user to request information from host devices 14, robot controllers 34, and/or probes 38. For example, a user may want to view a particular type of information. The user may communicate such a request (using user device 50) to a robot controller 34 (such as robot controller 34a), causing a probe 38 (such as probe 38a) to monitor for, and provide such information for view by the user. User device 50 may comprise a user interface, such as a display, a microphone, keypad, or other appropriate terminal equipment usable by a user.

User device 50 may display a graphical user interface 54 in order to allow a user to view the monitored information (such as the monitored information provided by host devices 14 and/or information database 58). Graphical user interface 54 may include any graphical interface that allows the user to view the monitored information, request particular monitored information (such as from host devices 14 and/or information database 58), communicate with monitoring database 66 (such as to request a new version of particular probes 38), or any combination of the preceding. Graphical user interface 54 may be accessible to a user through a web browser (or other portlet), in particular embodiments.

Graphical user interface 54 may display any information monitored by probes 38. For example, if a user requests information regarding devices connected to network 42, graphical user interface 54 may display a list of such devices, the IP address of each of the devices, the type of operating system 30 of those devices, the type and number of probes 38 installed on the devices, or any combination of the preceding. As another example, if a user requests information regarding alarms associated with the monitored information, graphical user interface 54 may display each of the alarms that have been generated, how many times those alarms have been generated, the devices those alarms are associated with, the probes associated with those alarms, or any combination of the preceding. Graphical user interface 54 may display the monitored information in real time or near real time (e.g., real time plus the time associated with monitoring, communicating, and formatting the information). In such an example, the user may request the monitored information directly from probes 38, and the monitored information may be provided in real time or near real time. Graphical user interface 54 may further display historical (or non-real time) monitored information. In such an example, the user may request the monitored information from the information database 58, and the monitored information may be provided. Graphical user interface 54 may display the monitored information in any configuration. Furthermore, graphical user interface 54 may be configured by the user in any manner to display the monitored information.

Information database 58 represents any components that may store information monitored by probes 38. For example, information database 58 may store information monitored by probes 38 and communicated to information database 58 for storage. Information database 58 may include a network server, any remote server, a mainframe, a host computer, a workstation, a web space server, a personal computer, a file server, a virtual device, or any other device that may store information monitored by probes 38. The functions of information database 58 may be performed by any combination of one or more servers or other components at one or more locations. In the embodiment where the module is a server, the server may be a virtual or physical server. The server may include one or more servers at the same or remote locations. In addition to storing information monitored by probes 38, information database 58 may further provide the information for view by a user. For example, a user may send a message to information database 58 that requests particular information from information database 58. As such, information database 58 may gather such information and communicate it for view by the user on user device 50. Furthermore, although system 10 illustrates information database 58 as being connected to network 42, in particular embodiments, information database 58 may be connected to network 62.

Network 62 represents any network operable to facilitate communication between various components of system 10, such as hub 46 (and/or any other devices connected to network 42) and monitoring database 66. Network 62 may include any interconnecting system capable of transmitting audio, video, signals, data, messages, or any combination of the preceding. Network 62 may include all or a portion of a PSTN, a public or private data network, a LAN, a MAN, a WAN, a local, regional, or global communication or computer network, such as the Internet, a wireline or wireless network, an enterprise intranet, or any other communication link, including combinations thereof, operable to facilitate communication between the components. Although FIG. 1 illustrates network 62 as being a separate network from network 42, in particular embodiments, network 62 and network 42 may both be the same network.

Monitoring database 66 stores, either permanently or temporarily, data, operational software, or other information for system 10. Monitoring database 66 includes any suitable combination of volatile or non-volatile local or remote devices suitable for storing information. For example, monitoring database 66 may include RAM, ROM, magnetic storage devices, optical storage devices, or any other information storage device or a combination of these devices. Monitoring database 66 represents any components that may communicate with hub 46 (and/or any other devices connected to network 42). Monitoring database 66 may include a network server, any remote server, a mainframe, a host computer, a workstation, a web space server, a personal computer, a file server, a virtual device, or any other device that may communicate with hub 46 (and/or any other devices connected to network 42). The functions of monitoring database 66 may be performed by any combination of one or more servers or other components at one or more locations. In the embodiment where the module is a server, the server may be a virtual or physical server. The server may include one or more servers at the same or remote locations. Monitoring database 66 may be a part of any other component shown in system 10.

Monitoring database 66 may store packages associated with monitoring information. For example, monitoring database 66 may store packages that include the instructions, logic, or code associated with hub 46, robot controllers 34, and probes 38. In such an example, these packages may be downloaded (or otherwise communicated) from monitoring database 66 for installation on one or more devices (such as, for example, host device 14a) of network 42. Monitoring database 66 may store usage information associated with network 42, in particular embodiments. For example, in response to the use of robot controllers 34 and/or probes 38 in network 42, information associated with that usage (such as the amount of such usage, what host devices 14 the usage occurred on, etc.) may be communicated to monitoring database 66 (from host devices 14) for storage. This usage information may allow monitoring database 66 to calculate a bill associated with the usage, in particular embodiments. The bill may represent the cost associated with the use of robot controllers 34 and probes 38 to monitor information associated with host devices 14.

In operation of an example embodiment, a user may want to monitor information associated with one or more devices of a network (such as network 42). Furthermore, the user may also want to view the monitored information or information determined from the monitored information. A hub 46 may be installed in network 42 and one or more robot controllers 34 and probes 38 may be installed in one or more host devices 14 of network 42. The installation of hub 46, robot controllers 34, and probes 38 may occur in any suitable manner. For example, instructions, logic, or code associated with hub 46, robot controllers 34, and/or probes 38 may be downloaded from, for example, monitoring database 66 and installed in network 42 (such as installed on host device 14).

After robot controllers 34 and probes 38 are installed on host devices 14, probes 38 may monitor information associated with the host devices 14. This monitored information may be communicated to information database 58 for storage. A user may utilize user device 50 in order to request this stored information for viewing on graphical user interface 54. The monitored information may also be communicated directly to user device 50 for display in graphical user interface 54. In such an example, a user may request that a probe 38 monitor particular information associated with host devices 14 (such as the unused memory in host device 14n). In response to this request, the probe 38 may monitor the information and send it directly to user device 50 for view in graphical user interface 54 in real time (or near real time). A user may be able to view and understand any monitorable aspects of the network and/or devices operating in the network.

In response to utilization of robot controllers 34 and/or probes 38, usage information may be monitored such as by one of the probes 38) and communicated to monitoring database 66. This usage information may be used by monitoring database 66 to calculate a bill associated with the use of robot controllers 34 and probes 38. Furthermore, this bill may be communicated to the user of user device 50 (or any other entity associated with user device 50) for payment.

In particular embodiments, probes 38 may communicate monitored information to other components of system 10 by sending messages using network 42. In particular embodiments, probes 38 may directly send/receive messages to/from other components of system 10. For example, probe 38a may send a message directed to hub 46a and hub 46a may send a message directed to probe 38a.

In particular embodiments, probes 38 may publish messages on network 42 (also referred to as message bus 42). Published messages may not be directed to any one destination component. Instead, any interested component of system 10 may listen for and receive published messages from network 42. As an example, probe 38a may publish a message of message type X on network 42. Hub 46a may be interested in receiving all messages of type X. Hub 46 may monitor all messages on network 42 for messages of type X. When detecting a message of type X, hub 46 may process the message. Probe 38c may also be interested in receiving all messages of type X. Probe 38c may receive a message of type X published by probe 38a. Probe 38c may also receive a message of type X published by probe 38b. Probe 38c may aggregate information from the messages received from probe 38a and probe 38b and publish the aggregated information in a message of type Y. Components of system 10, such as probes 38 and hubs 46, may be interested in receiving or publishing any number of different message types. Components of system 10 may also monitor for messages based on message sender, any other message field, or any combination of message fields.

Modifications, additions, or omissions may be made to system 10 without departing from the scope of the invention. Additionally, system 10 may include any number of host devices 14, networks 42, user devices 50, information databases 58, networks 62, and/or monitoring databases 66. Furthermore, any suitable logic may perform the functions of system 10 and the components within system 10.

Figure 2:
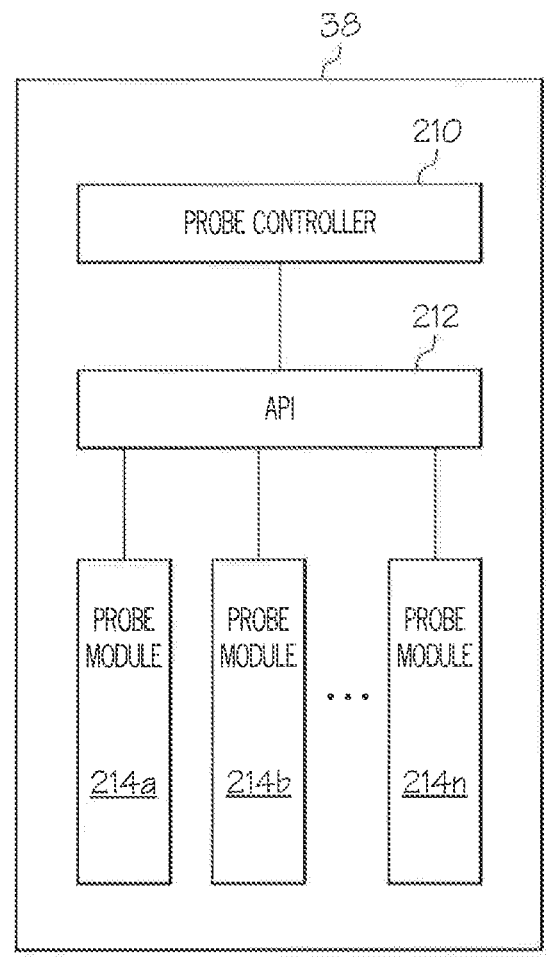
FIG. 2 illustrates an example of a probe for monitoring information associated with host devices according to one embodiment of the present disclosure.

FIG. 2 illustrates an example of a probe 38 for monitoring information associated with host devices 14 according to one embodiment of the present disclosure. As illustrated, probe 38 comprises probe controller 210, application programming interface (API) 212, and a plurality of specialized probe modules 214. As described above with reference to FIG. 1, a first probe 38 may monitor for a first type of information, while a second probe 38 may monitor for a different type of information. For example, first probe 38 may contain functionality for the specific purpose of monitoring attributes of a database running on host device 14 and second probe 38 may contain functionality for the specific purpose of monitoring CPU performance of host device 14. Although first and second probe 38 may monitor different types of information, they may also share common functionality. For example, both probes 38 may maintain timers for scheduling collection of information, may compare measurements to thresholds, may publish. information on a message bus, and may send alarms. In particular embodiments, functionality common among probes 38 may be implemented by probe controller 210. Plugins for purpose specific functionality may be implemented by specialized probe modules 214. Probe controller 210 and specialized probe modules 214 may communicate using API 212. According to some embodiments, probe controller 210 and API 212 may provide an abstraction layer for monitoring heterogeneous network elements (e.g., host devices 14) and each specialized probe module 214 may monitor a particular type of network element (e.g., host device 14). A particular type of host device may represent classes of equipment such as servers, laptops, desktops, wireless devices, routers, or switches. A particular type of host device may represent equipment made by the same manufacturer or equipment running the same operating system. Host devices may be classified into types by functionality, such as database servers or web servers. Host devices may be classified into types by any suitable attribute.

A software developer or other suitable entity may recognize advantages associated with such an architecture. For example, a software developer implementing a special purpose probe may focus on developing and testing specialized probe module 214. By factoring out common functionality to probe controller 210, specialized probe module 214 may be developed and tested more efficiently. Because API 212 provides an abstracted probe interface to probe controller 210, parties other than the developer of probe controller 210 may develop specialized probe modules. For example, a network operator may develop a customized specialized probe module 214 according to their particular needs.

Probe controller 210 represents any suitable set of instructions, logic, or code embodied in a computer readable storage medium and operable to perform functionality common among probes 38. Probes 38 may monitor attributes of host device 14 according to a particular schedule, particular intervals, or some other suitable trigger. Because the particular monitoring schedule may differ between different probe types, probe controller 210 may define a normalized scheduling abstraction. Probe controller 210 may implement the scheduling abstraction to notify specialized probe module 214 when specialized probe module 214 should perform its purpose specific data collection activities. Probe controller 210 is not required to know the particular monitoring schedule associated with a particular specialized probe module 214. Probe controller 210 may the same normalized scheduling abstraction to notify any specialized probe modules 214 how often to perform data collection. Because each specialized probe module 214 may operate on a different schedule, each specialized probe module 214 may inform probe controller 210 of a specific duration, interval, or trigger value that probe controller 210 may use for notifying specialized probe module 214 to perform data collection.

For example, a first specialized probe module 214 may inform probe controller 210 that first specialized probe module 214 should perform its special purpose data collection every fifteen minutes. Probe controller 210 may use the normalized scheduling interface to notify first specialized probe module 214 to perform its data collection every fifteen minutes. A second specialized probe module 214 may inform probe controller 210 that second specialized probe module 214 should perform its special purpose data collection every thirty seconds. Probe controller 210 may use the normalized scheduling interface to notify second specialized probe module 214 to perform its data collection every thirty seconds.

In particular embodiments, probe controller 210 may implement functionality to send or receive messages using network 42. Some components of system 10 may expect messages to contain particular fields or to comply with a particular format. For example, hub 46 may expect messages to include a message type field or a source identifier field. Probe controller 210 may format information received from specialized probe module 214 in a suitable format for transmission on network 42. Probe controller 210 may also implement functionality to receive messages from network 42 and may determine whether contents of a received message should be communicated to specialized probe module 214.

In particular embodiments, probe controller 210 may implement functionality to compare information received from specialized probe module 214 with threshold values or other suitable values. After evaluating the comparison, probe controller 210 may perform some action. For example, probe controller 210 may compare received data value X with threshold T, and if X is greater than T, probe controller 210 may send an alarm indication. In certain embodiments, probe controller 210 may not know wheat units or measurements are represented by X or T, but probe controller 210 may still compare the values. For example, probe controller 210 may not know whether X represents a disk usage value or a CPU usage value and may not know how a particular value of T is determined, but probe controller 210 may still compare X and T and perform some action based on the comparison.

Specialized probe module 214 represents any suitable set of instructions, logic, or code embodied in a computer readable storage medium and operable to retrieve information about host device 14. Specialized probe module 214 may be a plugin module specialized for a particular purpose.

For example, a first specialized probe module 214 may be specialized to collect information from a database management application running on host device 14. First specialized probe module 214 understands what information should be collected and how to collect the information. For example, first specialized probe module 214 may be specialized to collect information about total disk usage associated with the database management application. First specialized probe module 214 may determine an appropriate threshold value for total disk usage might be eighty-five percent of available disk usage. First specialized probe module 214 may want to collect disk usage information every fifteen minutes.

As another example, a second specialized probe module 214 may be specialized to collect CPU performance information from host device 14. Second specialized probe module 214 may be specialized to collect average CPU utilization information for host device 14. Second specialized probe module 214 may want to collect information every thirty seconds. Second specialized probe module 214 may determine an appropriate threshold value for CPU utilization is eighty percent utilization over ten consecutive monitoring periods. In some embodiments, a network operator (network administrator, network user, or any suitable person or machine) may set static threshold values.

In some embodiments, specialized probe module 214 may dynamically determine thresholds based on information collected during previous collection cycles. For example, specialized probe module 214 specialized to collect CPU performance information may be statically configured with a threshold value of eighty percent CPU utilization. Alternatively, specialized probe module 214 may determine based on an average of prior measurements that a normal CPU usage value is sixty-five percent. Specialized probe module 214 may configure a CPU utilization threshold as some deviation from the measured average of sixty-five percent. Specialized probe module 214 may communicate determined threshold values to probe controller 210 for probe controller 210 to use in its comparisons.

In particular embodiments, specialized probe module 214 may be specialized to collect information from other probes 38. An example specialized probe module 214, which may also be referred to as a derived metrics engine 214, may request probe controller 210 to monitor network 42 for particular messages types from other probes 38 and to forward those messages to specialized probe module 214. In some embodiments, derived metrics engine 214 may modify information contained within the monitored message type and then request probe controller 210 to publish the modified information in another message.

For example, a derived metrics engine 214 may monitor for messages containing disk usage information. The disk usage information in the message may be represented as a number of bytes of consumed disk space. Derived metrics engine 214 may convert the disk usage information contained in the message from a number of bytes to a percentage of total disk space available. Derived metrics engine 214 may then request probe controller 210 to publish the new information.

Using a derived metrics engine, a network operator (network administrator, network user, or any suitable person or machine) may customize information reported about the network without modifying or replacing an existing probe 38. A network operator may deploy a probe 38 comprising a specialized probe module 214 configured to derive customized information based on information in existing messages.

As another example, specialized probe module 214 may be specialized to aggregate information collected from other probes 38. For example, referring to FIG. 1, probe 38c may listen for all messages of message type X coming from probes 38a and 38b. In one example, host devices 14a and 14b may represent web servers located behind a load balancer and message type X may contain information about the number of simultaneous connections on each web server. Probe 38a may periodically publish message type X containing the number of simultaneous web server connections on host device 14a. Probe 38b may periodically publish message type X containing the number of simultaneous web server connections on host device 14b. Probe 38c may comprise specialized probe module 214 specialized to listen for and receive messages of type X and to calculate the average number of web server connections handled by the load balancer, which specialized probe module 214 may derive from information contained in messages of type X that it receives from probes 38a and 38b. A network operator may use such derived information to determine whether its web hosting service is near capacity.

The location of specialized probe module 214 within system 10 may determine what messages are available to specialized probe module 214. For example, a specialized probe module 214 located on a host device 14 may only have access to messages from other probes 38 located on the same host device 14. A specialized probe module 214 located on a regional hub 46 may have access to messages from all probes 38 located on the regional portion of the network. In some embodiments, robot controller 34 may be configured to share messages between probes 38 located on the same host device 14. Robot controller 34 may share messages between probes 38 under its control without publishing messages on network 42.

In particular embodiments, API 212 may comprise an interface for communicating between probe controller 210 and specialized device probe 214. In particular embodiments, API 212 may comprise a programming language independent interface. For example, probe controller 210 may be implemented with Java (or any other suitable programming language) and a plugin specialized probe module 214 may be implemented using Java, Ruby, Perl, C, C++, or any other suitable programming language. A language independent API may allow a developer of specialized probe module 214 to choose a language best suited for the particular specialized purpose. For example, a developer may choose Perl for a specialized probe module that parses textual output of system commands. A developer may choose C for a specialized probe module that reads values from a device register.

Figure 3:
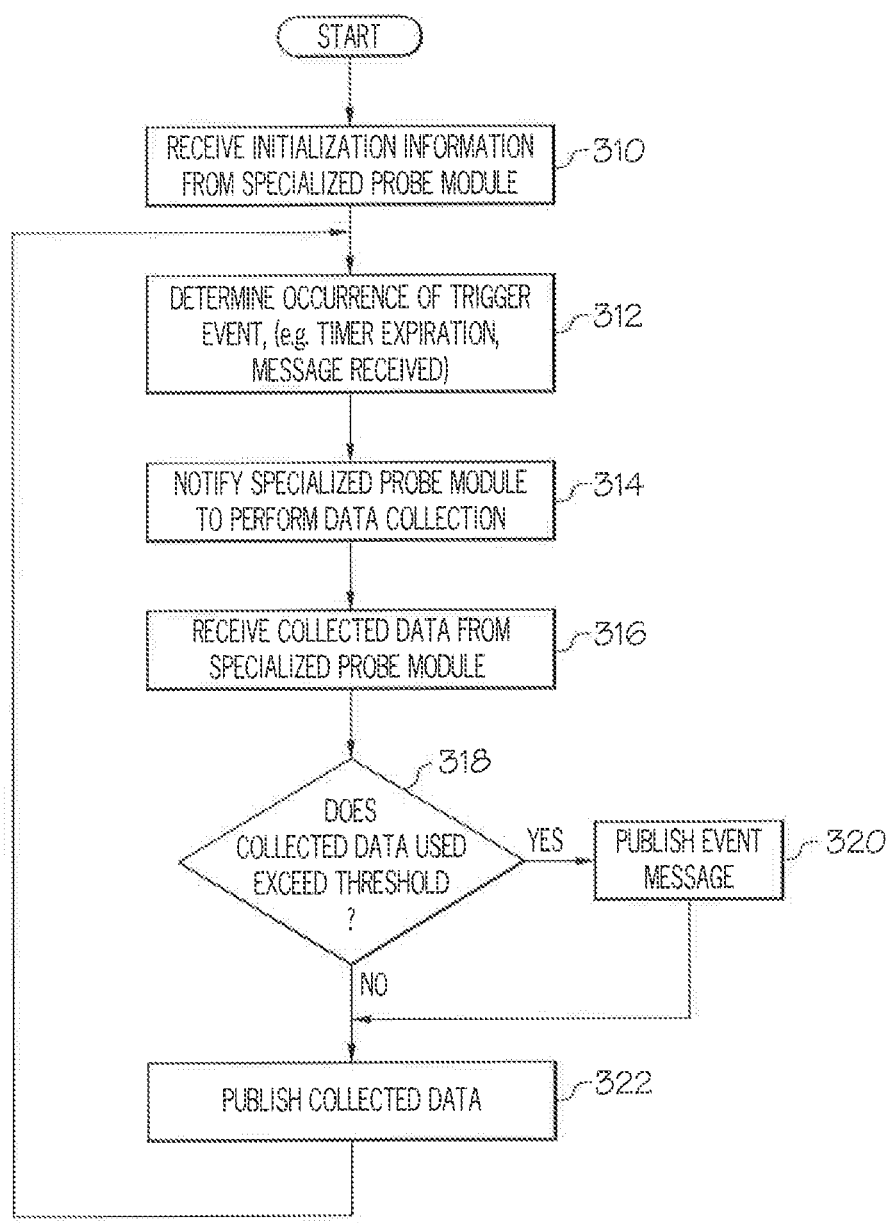
FIG. 3 illustrates an example of a method for implementing a probe controller according to one embodiment of the present disclosure.

FIG. 3 illustrates an example of a method 300 for implementing a probe controller according to one embodiment of the present disclosure. In particular embodiments, one or more steps of method 300 may be performed by probe 38 of FIG. 1, and particularly by probe controller 210 of FIG. 2.

The method begins at step 310. At step 310, probe controller 210 receives initialization information from specialized probe module 214. Initialization information may include any information about specialized probe module 214. For example, initialization information may include information about a data collection schedule for specialized probe module 214 (e.g., periodic intervals, message trigger, or any other suitable schedule). In some embodiments, initialization information may include one or more message types. Probe controller 210 may use the message types to monitor network 42 for messages of the message type indicated in the initialization information. Initialization information may include one or more threshold values. Initialization information may include one or more actions to perform after probe controller 210 performs a comparison with a threshold value. Initialization information may include any other initialization information or combination of the preceding. In some embodiments, probe controller 210 or specialized probe module 214 may update the initialized values with new values as method 300 continues. A first specialized probe module 214 specialized for a first purpose may send different initialization information to probe controller 210 than a second specialized probe module 214 specialized for a different purpose. Different specialized probe modules 214 may send a different set of initialization information or different values for the same set of initialization information. Probe controller 210 may receive initialization, information from specialized probe module 214 via API 212, as seen in FIG. 2, in particular embodiments. In some embodiments, probe controller 210 may retrieve initialization information from an initialization file.

As an example, a CPU probe 38 may comprise probe controller 210, API 212, and CPU specialized probe module 214. CPU specialized probe module 214 may use API 212 to send initialization information to probe controller 210. The initialization information may indicate that CPU specialized probe module 214 wants to perform data collection every thirty seconds. CPU specialized probe module 214 may indicate that probe controller 210 should compare collected value X to threshold T. CPU specialized probe module 214 may indicate that threshold T has an integer value of 85, which may represent eighty percent of CPU usage of host device 114. CPU specialized probe module 214 may indicate that probe controller 210 should trigger an alarm if collected value X exceeds threshold T.

As another example, a web server probe 38 may comprise probe controller 210, API 212, and web server specialized probe module 214. Web server specialized probe module 214 may use API 212 to send initialization information to probe controller 210. The initialization information may indicate that web server specialized probe module 214 wants to perform data collection whenever probe controller 210 detects a message of type X on network 42.

At step 312, probe controller 210 determines a scheduling event has occurred. In some embodiments, probe controller 210 may determine a scheduling event has occurred based on expiration of a timer. The timer's duration or period may have been determined by initialization information received from specialized probe module 214. In some embodiments, probe controller 210 may determine a scheduling event has occurred based on reception of a particular message type. The particular message type may have been determined by initialization information received from specialized probe module 214. In some embodiments, probe controller may determine a scheduling event has occurred based on any suitable trigger.

For example, probe controller 210 of CPU probe 38 may start a periodic timer to expire every thirty seconds based on initialization information received from CPU specialized probe module 214. Probe controller 210 may determine a scheduling event has occurred each time the periodic timer expires.

As another example, probe controller 210 of web server probe 38 may monitor network 42 for a message of type X based on initialization information received from web server probe module 214. For example, referring to FIG. 1, probe controller 210 may listen for all messages of type X coming from probes 38a and 38b, where host devices 14a and 14b may represent web servers located behind a load balancer and message type X may contain information about the number of simultaneous connections on each web server.

Probe controller 210 may determine a scheduling event has occurred when it receives a message of type X.

At step 314, probe controller 210 may notify specialized probe module 214 to perform data collection. Probe controller 210 may notify specialized probe module 214 to perform data collection using API 212. In some embodiments, the notification may comprise a trigger to cause specialized probe module 214 to perform data collection. In some embodiments, the notification may comprise information in addition to a trigger to cause specialized probe module 214 to perform data collection. For example, additional information may include contents of a received message that triggered a scheduling event. As another example, where a scheduling event may be based on multiple time intervals (e.g., fifteen minutes, one hour, and one day), additional information may include information identifying the time interval associated with the notification.

For example, after expiration of a thirty second timer, probe controller 210 of CPU probe 38 may notify CPU specialized probe module 214, via API 212, to perform data collection. The notification may contain information to cause CPU specialized probe module 214 to perform data collection.

As another example, after receiving a message of type X, probe controller 210 of web server probe 38 may notify web server specialized probe module 214, via API 212, to perform data collection. The notification may contain information from the received message of type X, such as a number of simultaneous web server connections on host device 14.

At step 316, probe controller 210 may receive collected data from specialized probe module 214. Probe controller 210 may receive collected data from specialized probe module 214 via API 212. The collected data may contain any information collected by specialized probe module 214.

For example, probe controller 210 of CPU probe 38 may receive collected data from CPU specialized probe module 214 via API 212. The collected data may comprise a measurement of CPU utilization of host device 14.

As another example, probe controller 210 of web server probe 38 may receive collected data from web server specialized probe module 214 via API 212. The collected data may comprise information aggregated from several messages of type from multiple sources. For example, web server specialized probe module 214 may calculate the average number of web server connections handled by the load balancer derived from information contained in messages of type X received from probes 38a and 38b.

At step 318, probe controller 210 may determine whether collected data received from specialized probe module 214 exceeds a threshold. The threshold may be determined by initialization information received from specialized probe module 214. In some embodiments, probe controller 210 may mathematically compare (e.g., greater than, less than, equal to, or any other suitable comparison) a collected data value with a threshold value. In some embodiments, probe controller 210 may compare string or character values alphabetically. Probe controller 210 may compare a collected data value with a threshold value using any suitable comparison.

For example, probe controller 210 of CPU probe 38 may receive, from CPU specialized probe module, collected data comprising a measurement of CPU utilization of host device 114. Probe controller 210 may have previously received a threshold value of eighty, which may have been part of the initialization information received from CPU specialized probe module. Probe controller 210 may compare the collected data with the threshold value to determine whether the value of the collected data is greater than eighty. In some embodiments, the threshold value may be dynamically determined based on a historical average of CPU utilization of host device 114. If average CPU usage of host device 114 approaches seventy-five percent, CPU specialized probe module 214 may determine that the threshold value should be increased to eighty-five, CPU specialized probe module 214 may indicate to probe controller 210, via API 212, to update the threshold value to eighty-five. Probe controller 210 may use the updated threshold value to determine whether collected data received from specialized probe module 214 exceeds a threshold.

As another example, probe controller 210 of web server probe 38 may receive, from. web server specialized probe module, collected data comprising an average number of web server connections handled by the load balancer. Probe controller 210 may compare the collected data with a threshold value to determine whether the collected data exceeds the threshold. In some embodiments, a network operator may statically configure web server specialized probe module 214 with a threshold value, such as eighty-five percent of total web server capacity. In some embodiments, web server specialized probe module 214 may dynamically determine (based on prior measurements, projected measurements, or any other suitable method) a suitable threshold value.

At step 320, if probe controller 210 determined the collected data received from specialized probe module 214 exceeded a threshold, probe controller 210 may publish an event notification. In some embodiments, specialized probe module 214 may have initialized probe controller 210 with a list of actions to perform when a collected data value exceeds a threshold. For example, if collected data exceeds a first threshold, probe controller 210 may publish an event notification with an associated first severity level. If collected data exceeds a second threshold, probe controller 210 may publish an event notification with an associated second severity level. The event notification may comprise the collected data, the threshold value, or any other relevant information. Probe controller 210 may take any suitable action upon determination that the collected data received front specialized probe module 214 exceeds a threshold.

For example, probe controller 210 of CPU probe 38 may publish an event notification upon determination that the collected CPU utilization data exceeds eighty percent. The event notification may include the collected CPU utilization data and the threshold value of eighty percent. The event notification may also include time of day or any other relevant information.

As another example, probe controller 210 of web server probe 38 may publish an event notification upon determination that the collected number of web server connections handled by the load balancer exceeds a threshold value of eighty-five percent.

At step 322, probe controller 210 may publish the collected data on network 42 for use by other components of system 10, such as hubs 46, robot controllers 34, other probes 38, user devices 50, information databases 58, monitoring databases 66, or any other suitable component.

After step 322, probe controller 210 may return to step 312 and wait for an occurrence of the next scheduling event. Modifications, additions, or omissions may be made to method 300. Additionally, one or more steps in method 300 of FIG. 3 may be performed in parallel or in any suitable order.

Figure 4:
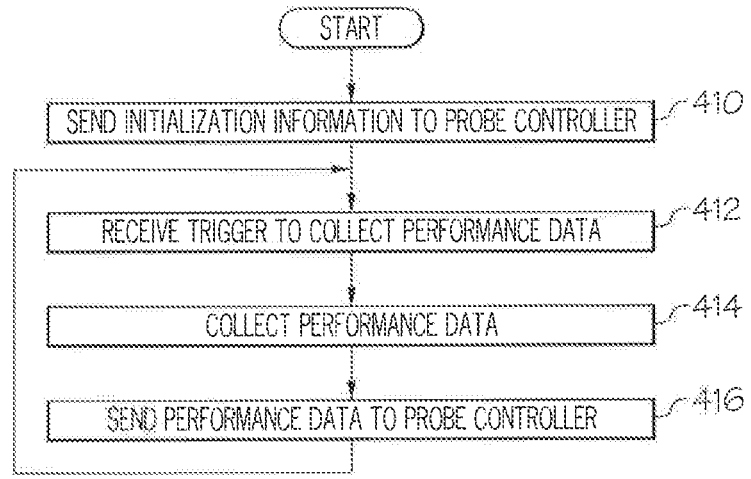
FIG. 4 illustrates an example of a method for implementing a specialized probe module according to one embodiment of the present disclosure.

FIG. 4 illustrates an example of a method 400 for implementing a specialized probe module according to one embodiment of the present disclosure. In particular embodiments, one or more steps of method 400 may be performed by probe 38 of FIG. 1, and particularly by specialized probe module 214 of FIG. 2.

The method begins at step 410. At step 410, specialized probe module 214 registers initialization information with probe controller 210. As described above in reference to FIG. 3, initialization information may include information about a data collection schedule (e.g., periodic intervals, message trigger, or any other suitable schedule), message types, threshold values, actions to perform (e.g., after comparison with a threshold value), any information about specialized probe module 214, or any combination of the preceding. Specialized probe module 214 may send initialization information to probe controller 210 via API 212, in particular embodiments. In some embodiments, initialization information may be contained in an initialization file. Specialized probe module 214 may notify probe controller 210 to process the initialization file. In some embodiments, probe controller 210 may check for an initialization file.

At step 412, specialized probe module 214 receives a notification from probe controller 410, via API 212, to collect performance data. As described above in reference to FIG. 3, the notification may comprise a trigger to cause specialized probe module 214 to perform data collection or the notification may comprise information in addition to a trigger such as contents of a received message, information identifying a time interval associated with the notification, or any other relevant information.

For example, CPU specialized probe module 214 may receive a notification from probe controller 210 of CPU probe 38, via API 212, to perform data collection. The notification may not contain any information other than a trigger to cause CPU specialized probe module 214 to perform data collection about CPU usage on host device 14.

As another example, web server specialized probe module 214 may receive a notification from probe controller 210 of web server probe 38, via API 21.2, to perform data collection. The notification may contain information from the received message of type X that triggered probe controller 210 to send the data collection notification to web server specialized probe module 214. The contents of the message of type X may include a number of simultaneous web server connections on host device 14.

At step 414, specialized probe module 214 performs data collection. Specialized probe module 214 contains suitable instructions, logic, or code specialized to collect data related to specific host device 14, specific applications running on host device 14, or specific devices or applications accessible from host device 14.

For example, CPU specialized probe module 214 may contain suitable instructions, logic, or code specialized to collect information about CPU usage of host device 14. In some embodiments, CPU specialized probe module 214 may contain instructions, logic, or code to query an operating system of device 114 to collect information about CPU usage.

As another example, web server specialized probe module 214 may contain suitable instructions, logic, or code specialized to average a number of simultaneous web server connections associated with a host device 14 by averaging data from a number of messages of type X. In some embodiments, web server specialized probe module 214 may average information contained in messages of type X received in a certain time period. In some embodiments, web server specialized probe module 214 may perform any suitable calculations based on the content of messages of type X.

At step 416, specialized probe module 214 sends the collected data to probe controller 210 via API 212. The collected data may contain any information collected by specialized probe module 214.

For example, CPU specialized probe module 214 may send collected data to probe controller 210 of CPU probe 38 via API 212. The collected data may comprise a measurement of CPU utilization of host device 14.

As another example, web server specialized probe module 214 may send collected data to probe controller 210 of web server probe 38 via API 212. The collected data may comprise information aggregated from several messages of type X from multiple sources. For example, web server specialized probe module 214 may calculate the average number of web server connections handled by the load balancer derived from information contained in messages of type X received from probes 38a and 38b.

After step 416, specialized probe module 214 may return to step 412 and wait for the next notification from probe controller 410 to collect performance data. Modifications, additions, or omissions may be made to method 400. Additionally, one or more steps in method 400 of FIG. 4 may be performed in parallel or in any suitable order.

Figure 5:
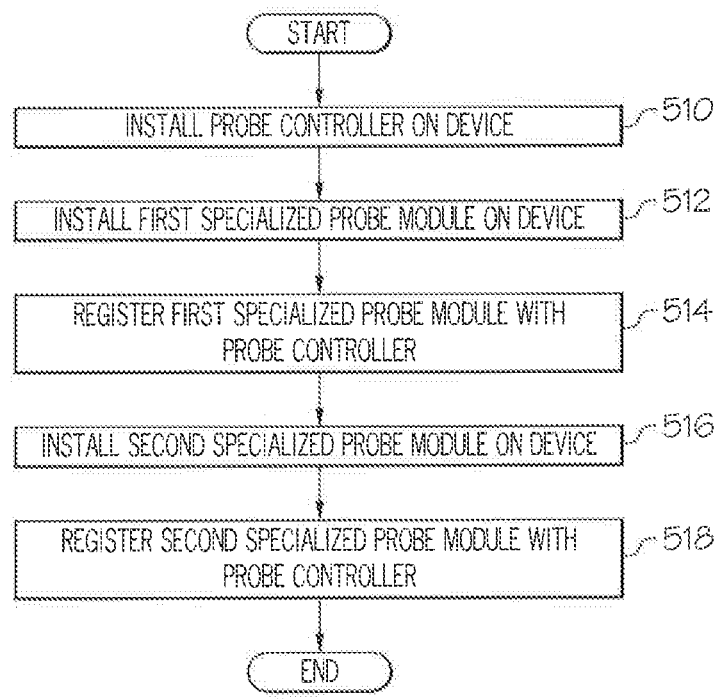
FIG. 5 illustrates an example of a method for implementing installation of specialized probe modules according to one embodiment of the present disclosure.

FIG. 5 illustrates an example of a method 500 for implementing installation of specialized probe modules according to one embodiment of the present disclosure. In particular embodiments, one or more steps of method 500 may be performed on, for example, host device 14 or hub 46 of FIG. 1. In some embodiments, one specialized probe module 214 may be associated with one probe controller 210. In some embodiments, more than one specialized probe module 214 may be associated with one probe controller 210.

The method begins at step 510. At step 510, a network operator, network administrator, network user, or any other suitable person or machine, installs instructions, logic, or code representing probe controller 210 into, for example, memory 26 of host device 14. At this point, probe controller 210 may execute instructions, logic, or code to monitor network 42 for messages. Probe controller 210 may also wait for communication via API 212.

At step 512, a network operator installs instructions, logic, or code representing a first specialized network probe module 214 into, for example, memory 26 of host device 14. A network operator may also install initialization or configuration files on host device 14.

At step 514, first specialized network probe module 214 executes instructions, logic, or code to make itself known to probe controller 210. In some embodiments, first specialized network probe module 214 may communicate initialization information to probe controller 210 using API 212. In some embodiments, probe controller 210 may autonomously detect first specialized probe module 214. In some embodiments, probe controller 210 may detect and process an initialization or configuration file associated with first specialized network probe module 214. At this point, probe controller 210 may interact with first specialized probe module 214 via API 212 to perform special purpose functions of probe 38 such as those described above in reference to FIG. 3 and FIG. 4.

At step 516, a network operator installs instructions, logic, or code representing a second specialized network probe module 214 into, for example, memory 26 of host device 14. A network operator may also install initialization or configuration files on host device 14.

At step 518, second specialized network probe module 214 executes instructions, logic, or code to make itself known to probe controller 210. In some embodiments, second specialized network probe module 214 may make itself known to probe controller 210 in the same way as first specialized network probe module 214, described in step 514. At this point, probe controller 210 may interact with both first and second specialized probe modules 214 via API 212 to perform special purpose functions of probe 38 such as those described above in reference to FIG. 3 and FIG. 4.

Modifications, additions, or omissions may be made to method 500. Additionally, one or more steps in method 500 of FIG. 5 may be performed in parallel or in any suitable order. For example, a single installation package may include probe controller 210, first specialized probe module 214, and any configuration or initialization files. As another example, a single installation package may include probe controller 210, first specialized probe module 214, second specialized probe module 214, and any configuration or initialization files. In some embodiments, one specialized probe module 214 may be associated with one probe controller 210. In some embodiments, any number of specialized probe modules 214 may be associated with one probe controller 210.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A system, comprising:
a memory operable to store instructions;
a processor communicably coupled to the memory and operable to execute the instructions, wherein the instructions comprise:
a probe controller associated with a host device and configured to perform operations comprising:
abstracting a plurality of device-specific monitoring operations associated with a plurality of heterogeneous host devices to a normalized set of monitoring operations; and
facilitating monitoring of the host device using the normalized set of monitoring operations; and
a first specialized probe module associated with the host device and configured to provide device-specific information in response to the normalized set of monitoring operations by performing operations comprising:
accessing, in response to receiving a notification from the probe controller to determine a metric associated with the host device, the metric associated with the host device; and
communicating the metric to the probe controller.

2. The system of claim 1, wherein the probe controller is configured to perform operations comprising:
receiving the determined metric from the first specialized probe module; and
publishing the determined metric.

3. The system of claim 1, further comprising:
a programming-language-independent interface to facilitate communication between the probe controller and the, first specialized probe module.

4. The system of claim 1, wherein the probe controller is configured to perform operations comprising:
accessing a schedule for collecting the metric associated with the host device; and
notifying, according to the schedule, the first specialized probe module to determine the metric associated with the host device.

5. The system of claim 4, wherein accessing a schedule for collecting the metric associated with the host device comprises:
monitoring a message bus accessible to a plurality of probe controllers; and
detecting that a predetermined message exists on the message bus.

6. The system of claim 1, further comprising a second specialized probe module associated with the host device operable to perform operations comprising:
accessing, in response, to receiving a notification from the probe controller to determine a second metric associated with the host device, the second metric associated with the host device; and
communicating the second metric to the probe controller.

7. The system of claim 1, wherein the probe controller is operable to perform operations comprising:
determining whether the metric received from the first specialized probe module exceeds a threshold associated with the metric associated with the host device.

8. The system of claim 7, wherein the threshold associated with the metric associated with the host device is dynamically determined based on previous values of the metric determined by the first specialized probe module.

9. The system of claim 7, wherein the probe controller is further operable, upon determining that the metric received from the first specialized probe module exceeds the threshold, to publish an event notification.

10. A non-transitory computer-readable storage medium having computer-readable program code embodied therewith, the computer-readable program code comprising:
a probe controller logic associated with a host device; and
a specialized probe module logic associated with the host device;
wherein the probe controller logic comprises computer-readable program code configured to perform operations comprising:
abstracting a plurality of device-specific monitoring operations associated with a plurality of heterogeneous host devices to a normalized set of monitoring operations; and
facilitating monitoring of the host device using the normalized set of monitoring operations; and
wherein the first specialized probe module logic comprises computer-readable program code configured to provide device-specific information in response to the normalized set of monitoring operations by performing operations comprising:
accessing, in response to receiving a notification from the probe controller logic to determine a metric associated with the host device, the metric associated with the host device; and
communicating the metric to the probe controller logic.

11. The computer-readable storage medium of claim 10, wherein the probe controller logic comprises computer-readable program code configured to perform operations comprising:
receiving the determined metric from the first specialized probe module logic; and
publishing the determined metric.

12. The computer-readable storage medium of claim 10, wherein the computer-readable program code further comprises computer-readable program code configured to facilitate communication between the probe controller logic and the first specialized probe module logic through a programming-language-independent interface.

13. The computer-readable storage medium of claim 10, wherein:
the computer-readable program code comprising the probe controller logic is associated with a first programming language; and
the computer-readable program code comprising the specialized probe module logic is associated with a second programming language different from the first programming language.

14. The computer-readable storage medium of claim 10, wherein the computer-readable program code comprising the probe controller logic is further operable to perform operations comprising:
accessing a schedule for collecting the metric associated with the host device; and
notifying, according to the schedule, the first specialized probe module logic to determine the metric associated with the host device.

15. The computer-readable storage medium of claim 10, wherein accessing a schedule for collecting the metric associated with the host device comprises:
monitoring a message bus accessible to a plurality of probe controllers; and
detecting that a predetermined message exists on the message bus.

16. The computer-readable storage medium of claim 10, wherein the computer-readable program code comprising the probe controller logic is further operable to perform operations comprising:
determining whether the metric received from the first specialized probe module exceeds a threshold associated with the metric associated with the host device.

17. The computer-readable storage medium of claim 16, wherein the threshold associated with the metric associated with the host device is dynamically determined based on previous values of the metric determined by the first specialized probe module logic.

18. The computer-readable storage medium of claim 17, wherein the computer-readable program code comprising the probe controller logic is further operable, upon determining the metric received from the first specialized probe module logic exceeds the threshold, to publish an event notification.

19. A method, comprising:
associating a first specialized probe module with a probe controller, wherein:
the probe controller is associated with a host device and operable to abstract a plurality of device-specific monitoring operations associated with a plurality of heterogeneous host devices to a normalized set of monitoring operations; and
the first specialized probe module is associated with the host device and operable to provide device-specific information in response to the normalized set of monitoring operations;
receiving a notification to determine a metric associated with the host device, wherein the notification comprises an operation of the normalized set of monitoring operations;
accessing the metric associated with the host device;
communicating the metric to the probe controller using an operation of the normalized set of monitoring operations.

20. The method of claim 19, wherein receiving a notification to determine a metric associated with the host device comprises receiving a notification through a programming-language-independent interface.

* * * * *